United States Patent [19]
Togawa

[11] Patent Number: 5,317,138
[45] Date of Patent: May 31, 1994

[54] INFORMATION RECORDING AND OR REPRODUCING APPARATUS FOR USE IN HYBRID TYPE INFORMATION RECORDING MEDIUM

[75] Inventor: Tsuyoshi Togawa, Tokyo, Japan

[73] Assignee: Olympus Optical Co., Ltd., Tokyo, Japan

[21] Appl. No.: 837,973

[22] Filed: Feb. 20, 1992

[30] Foreign Application Priority Data

Feb. 20, 1991 [JP] Japan .................................. 3-045547
Mar. 29, 1991 [JP] Japan .................................. 3-091033

[51] Int. Cl.⁵ .......................... G06K 7/00; G06K 19/08
[52] U.S. Cl. .................................... 235/440; 235/441; 235/454
[58] Field of Search ............... 235/440, 441, 454, 475, 235/492

[56] References Cited

U.S. PATENT DOCUMENTS

| | | | |
|---|---|---|---|
| 4,672,182 | 6/1987 | Hirokawa | 235/492 |
| 4,806,744 | 2/1989 | Briane et al. | 235/449 |
| 4,833,310 | 5/1989 | Shimamura et al. | 235/492 |
| 4,868,373 | 9/1989 | Opheij et al. | 235/454 |
| 4,935,916 | 6/1990 | Suzuki et al. | 235/454 |
| 4,960,982 | 10/1990 | Takahira | 235/492 |
| 5,010,239 | 4/1991 | Mita | 235/492 |

FOREIGN PATENT DOCUMENTS

| | | | |
|---|---|---|---|
| 386705 | 9/1990 | European Pat. Off. | 235/475 |
| 478373 | 4/1992 | European Pat. Off. | 235/475 |
| 3706836 | 9/1988 | Fed. Rep. of Germany | 235/449 |
| 6459578 | 3/1989 | Japan . | |
| 152685 | 6/1991 | Japan | 235/475 |

Primary Examiner—John Shepperd
Attorney, Agent, or Firm—Stevens, Davis, Miller & Mosher

[57] ABSTRACT

An information recording and/or reproducing apparatus for use in a hybrid type card-like information recording medium on which an IC chip and optical information recording area and/or magnetic information recording area are provided; in which a contact for connecting the IC chip and an information processor is provided in a shuttle for containing the hybrid card. Therefore, in the apparatus according to the invention, information can be recorded and/or reproduced in and-/or from IC chip formed on the medium without respect to the position of the shuttle. Further, it is possible to make the apparatus small in size and light in weight, because the independent mechanism for driving the terminal in accordance with the movement of the card is not necessary to be contained within the apparatus according to the invention.

15 Claims, 10 Drawing Sheets

FIG_1
PRIOR ART

FIG_2

FIG_3

FIG_4

FIG_5

FIG. 6

FIG_7

FIG_8

FIG_9

FIG_10

FIG_11

FIG_12

FIG_13

FIG_14

FIG_15

FIG_16

FIG_17

FIG_18

INFORMATION RECORDING AND OR REPRODUCING APPARATUS FOR USE IN HYBRID TYPE INFORMATION RECORDING MEDIUM

BACKGROUND OF THE INVENTION

1) Field of the Invention

The present invention relates to an information recording and/or reproducing apparatus for use in a hybrid type card-like information recording medium on the surface of which an IC chip and an optical information recording area and/or a magnetic information recording area are formed.

2) Description of the Related Art

Hitherto, an information industry has been remarkably developed, and the amount of information to be dealt with in such industry is increasing rapidly in proportion to the development of the industry.

A magnetic card, in which information is recorded and/or reproduced with the aid of magnetic stripe, has widely spread as a card-like information recording medium. Now, an IC card and an optical card, each of which has a great information capacity and a high portability, are suggested. The IC card comprises an IC chip, and information is recorded and/or reproduced in and/or from the IC chip with the aid of electric signals; on the other hand, the optical card comprises an optical information recording area thereon, and optical information is recorded and/or reproduced on and/or from the area with the aid of a laser beam.

Each of the card-like information recording media has good portability in addition to the following features. That is to say, the magnetic card can be manufactured at a low cost and information recorded thereon is rewritable, but the memory capacity is small; in the IC card, a high speed access is possible and transfer rate of data is high, but the cost for a unit memory capacity is high; and the optical card has a large memory capacity, i.e. several megabytes, but it is impossible to rewrite information recorded thereon.

Therefore, a hybrid type card, in which the above mentioned features of these card-like information recording media are mixed in order to compensate for each drawback of these media, is now suggested.

The information recording/reproducing apparatus for use in an optical card is, for instance, disclosed in Japanese Patent Preliminarily Laid-open Publication No. 2-144686. In the apparatus disclosed in this publication, an optical card is contained in a card container, so-called "shuttle" and the shuttle containing the optical card is relatively moved with respect to an optical head in a reciprocal manner to record and/or reproduce information on and/or from the optical card. However, when a user carries such an optical card, the card is usually stored in a purse or a pass case, so that the optical card is apt to become curved. Therefore, the shuttle is required to provide a function to correct the curved shape of the optical card. However, when the optical card is inserted in or removed from the shuttle, the function to correct the curved shape of the optical card serves as a resister to increase a load of a motor or to wear out the optical card. Therefore, it is required that such function should be releasable when the card is inserted in or removed from the shuttle.

In the case of the IC card, in order to record and/or reproduce information, a contact point (input and output terminal) formed on the IC card should be made to contact with a contact point formed in the apparatus. In Japanese Patent Preliminarily Laid-open Publication No. 64-76291, is disclosed an apparatus which has a function to contact the contact point of the IC card with the contact point of the apparatus. In the apparatus disclosed in this publication, it is arranged such that when the IC card is inserted in the apparatus a carriage comprising the apparatus-side contact point is moved to urge the apparatus-side contact point with the contacting point formed on the card; and when the IC card is removed from the apparatus, the carriage is moved to be separated from the card, so that the apparatus-side contact point is separated from the contact point on the card.

In case of the hybrid-type card, the information recording/reproducing apparatus therefor is required to provide a plurality of information recording/reproducing systems in accordance with the type of the recording media applied on the card, because different types of information recording/reproducing system are mixed on the hybrid-type card.

In Japanese Patent Preliminarily Laid-open Publication No. 64-59578, is disclosed an information recording/reproducing apparatus for use in a hybrid type information recording medium which has an optical information recording area and a magnetic information recording area.

Figure 1:
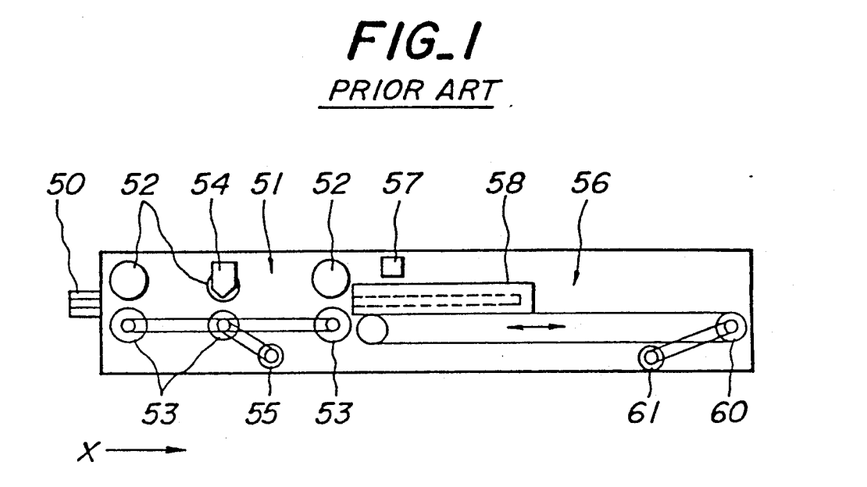
FIG. 1 is a schematic view showing a construction of the conventional apparatus.

FIG. 1 is a schematic view showing a construction of the information recording/reproducing apparatus disclosed in the Publication No. 64-59578. The apparatus comprises a magnetic information recording/reproducing section 51 and an optical information recording/reproducing section 56. These sections 51 and 56 are arranged in X direction (card insertion direction); and the section 51 is arranged in a front side (left side in FIG. 1) and the section 56 in a back side (right side in FIG. 1). A card-like information recording medium having an optical information recording area and a magnetic information recording area is inserted into a slot 50. In case magnetic information is recorded/reproduced on/from a magnetic stripe formed on the card-like information recording medium, information is recorded/reproduced in the magnetic information recording/reproducing section 51. The section 51 comprises upper rollers 52 and lower rollers 53 between which the magnetic card is held and transported; a magnetic head 54 by which information is recorded and/or reproduced on and/or from the magnetic stripe; and a motor 55 for rotating the lower roller 53 to transport the card.

On the other hand, in case optical information is recorded/reproduced on/from the optical information recording area of the card-like information recording medium, recording and/or reproduction of information is performed in the optical information recording/reproducing section 56. The section 56 comprises an optical head 57 by which optical information is recorded and/or reproduced on and/or from the optical information recording area, a shuttle 58 for containing the optical card, a shuttle moving device comprising a belt 59 for holding the shuttle 58 thereon a pulleys 60 over which the belt 59 is spread, and a motor 61 for rotating the pulleys 60, to relatively move the shuttle 58 with respect to the optical head 57.

However, in the apparatus disclosed in Japanese Patent Preliminarily Laid-open Publication No. 64-59578, for instance, when optical information is recorded/reproduced first and then magnetic information is recorded/reproduced, the hybrid card should be sent into the shuttle 58 firstly; and after information is recorded/reproduced on/from the optical information recording area by relative movement of the shuttle 58 with respect to the optical head 57, the shuttle 58 holding the card should be returned back to the connecting portion of the optical information recording area 56 and the magnetic information recording area 51, and then the hybrid card is returned back to the position under the magnetic head 54. Therefore, it is not possible to freely access both recording portions 51 and 56 of the apparatus. Further, since there are arranged the optical information recording area and the magnetic information recording area in an almost completely separated manner, the apparatus as a whole becomes large in size.

In order to make the size of the apparatus small, it is considered to arrange the apparatuses for the different type recording/reproducing systems at almost the same position. For instance, a combination of the apparatuses disclosed in the Japanese Patent Preliminarily Publication No. 64-76291 and No. 2-144686 can be considered for use in the hybrid type card having an IC chip and an optical information recording area. That is to say, an apparatus is suggested that the carriage having a terminal for making a contact with the IC chip formed on the card is arranged above the shuttle containing the card therein. However, in this case, when recording/reproducing information in the IC chip, the shuttle should be driven to a predetermined position and then the carriage or the card per se should be moved in order to contact the terminal with the IC chip.

However, in such construction, it is impossible to freely access to information recorded both on the optical information recording area and in the IC chip with a high speed. Further, since the carriage is arranged to be moved in upper and lower directions to urge the terminal of IC chip against the terminal of the carriage to release their contact, and since the correction mechanism for correcting the curve of the card should be arranged separately from the moving mechanism for separating the terminal of the IC chip from the terminal of the carriage, the apparatus becomes large in size, heavy in weight and high in cost, and the reliability of the apparatus becomes low. Furthermore, there is a problem that the optical information recording area is obliged to be made small in order to prevent that the optical system of the optical head is made contact with the carriage.

SUMMARY OF THE INVENTION

The present invention has for its purpose to provide an information recording/reproducing apparatus for use in a hybrid type card-like information recording medium having an IC chip and an optical information recording area and/or a magnetic information recording area; in the apparatus it is possible to freely access to the IC chip and the optical information recording area and/or the magnetic information recording area with a high reliability, but the apparatus can be made small in size, light in weight and low in cost.

In order to carry out the purpose, an information recording and/or reproducing apparatus for use in a hybrid type card-like information recording medium comprising an IC chip and an optical information recording area and/or a magnetic information recording area according to the present invention comprises:

a shuttle for containing said hybrid type card-like information recording medium and transferring it in an extended direction of tracks formed on the medium;

an optical head for recording and/or reproducing optical information on and/or from said optical information recording area formed on the medium, and/or a magnetic head for recording and/or reproducing information on and/or from said magnetic information recording area formed on the medium;

an information processing means for recording and/or reproducing information in and/or from said IC chip formed on the medium; and a contact means for making contact with said IC chip with said information processing means when said medium is inserted in the shuttle; said contact means being formed in said shuttle.

In the apparatus according to the present invention, since the contacting means for making a contact between the IC chip and the information processing means for recording/reproducing information in IC chip is provided in the shuttle, it is possible to record/reproduce information in/from the IC chip formed on the medium via the contacting means as the hybrid type card-like medium is inserted in the shuttle.

DESCRIPTION OF THE PREFERRED EMBODIMENTS

Figure 2:
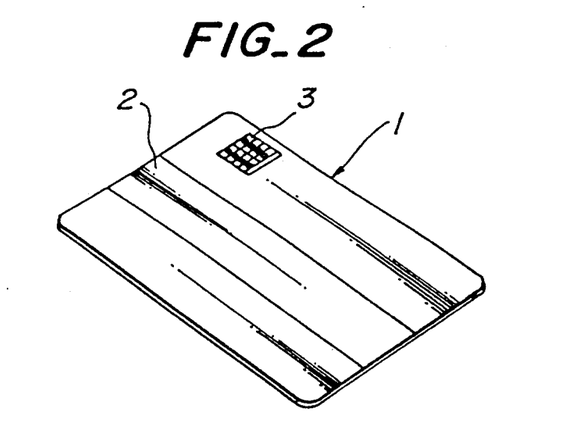
FIG. 2 is a schematic view depicting a construction of the hybrid type card used in the apparatus according to the present invention.

FIG. 2 is a schematic perspective view showing a construction of an example of a hybrid card 1 on which an optical information recording area 2 and an IC chip 3 are provided as shown in this figure. It should be noted that the IC chip 3 is arranged on the back surface of the card 1. In the optical information recording area 2, there are provided a plurality of tracks being extended in a longitudinal direction of the hybrid card 1; and on the surface of the IC portion 2 are arranged a plurality of terminals, through which information is recorded and/or reproduced in and/or from the IC chip 2.

Figure 3:
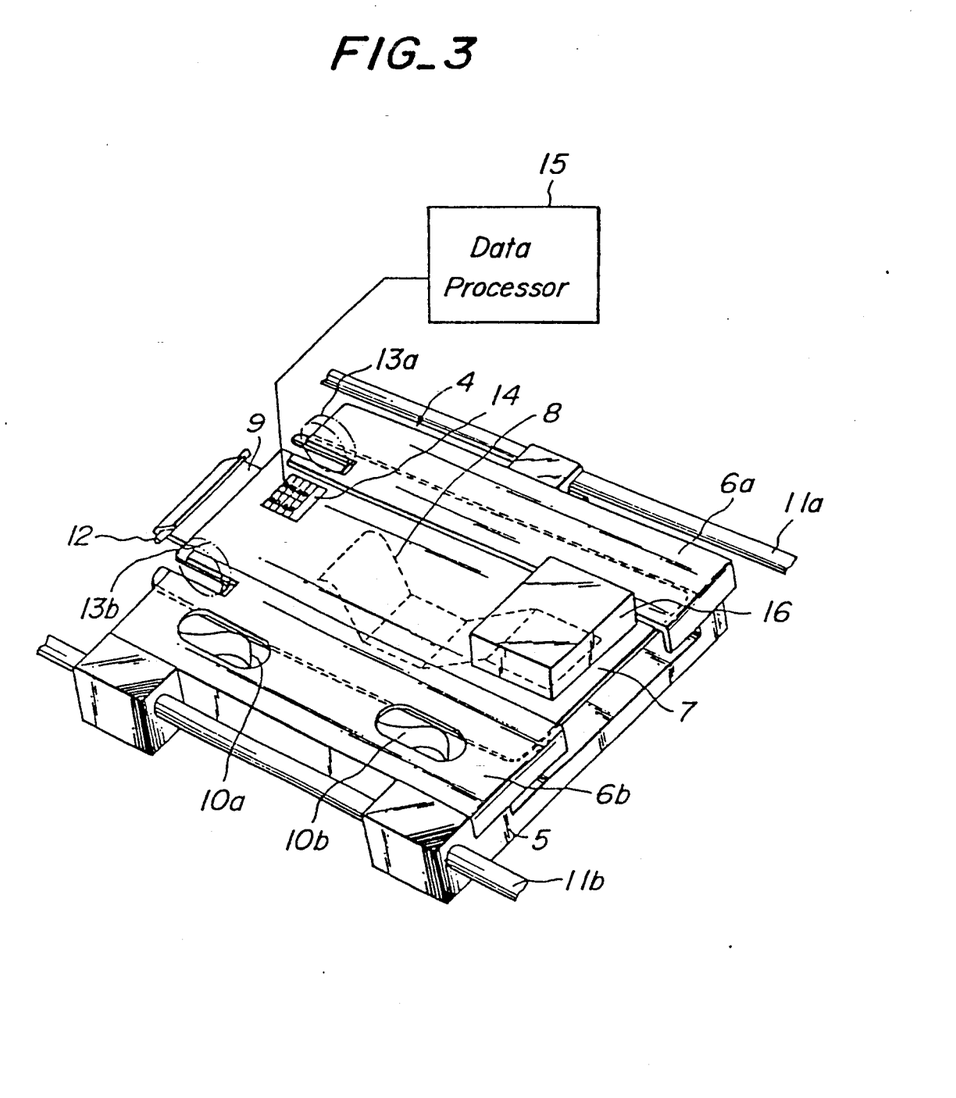
FIG. 3 is a schematic view illustrating a construction of the first embodiment of the apparatus according to the present invention.
Figure 4:
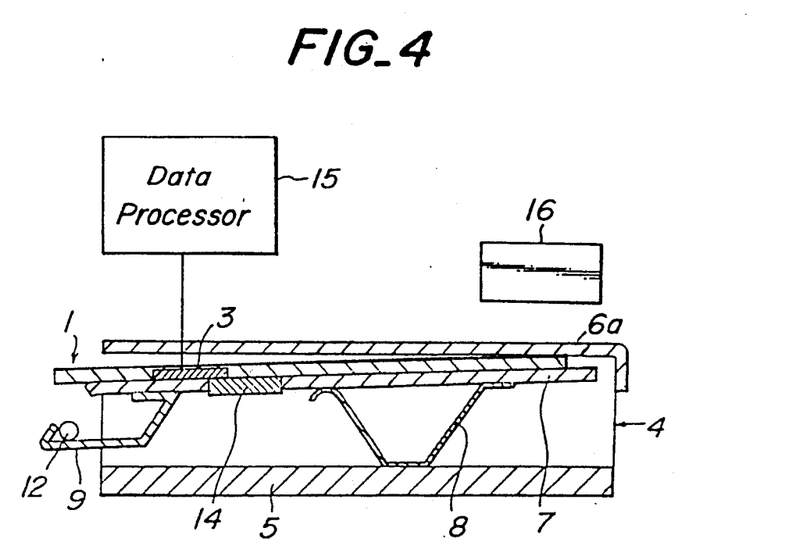
FIG. 4 is a cross-sectional view indicating a construction of the first embodiment when the hybrid card is being inserted into the shuttle of the apparatus.
Figure 5:
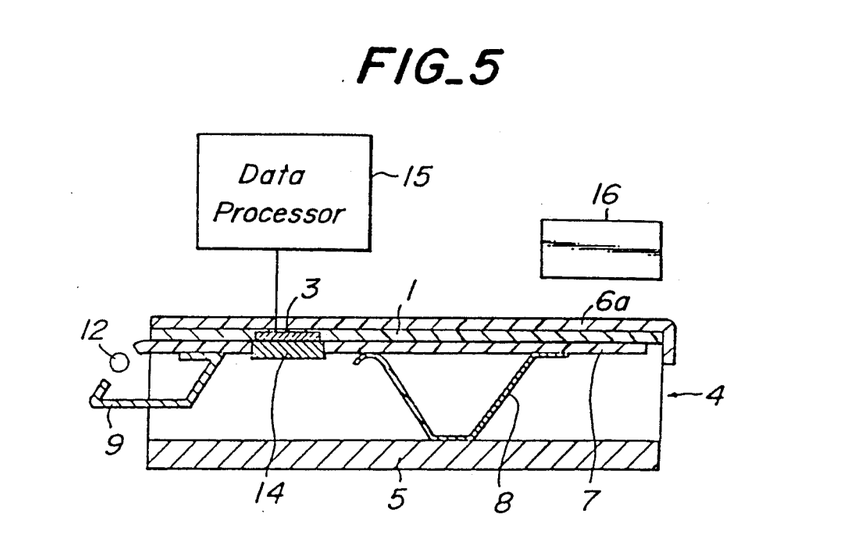
FIG. 5 is a cross-sectional view representing a construction of the first embodiment when the hybrid card has been inserted into the shuttle of the apparatus.

FIGS. 3 to 5 are schematic views showing an apparatus according to the first embodiment according to the present invention. FIG. 3 is a perspective view of a shuttle 4 of the apparatus; FIG. 4 a cross sectional view of the shuttle 4 when the hybrid card 1 is inserted/removed into/from the shuttle; and FIG. 5 is a cross sectional view of the shuttle 4 in which the hybrid card 1 in completely held. The apparatus according to the first embodiment is to record/reproduce information with respect to the hybrid card 1; on the front surface of the card 1 is arranged the optical information recording area 2, and on the back surface the IC chip 3 is provided. The shuttle 4 comprises a base plate 5; holding members 6a and 6b, provided on the upper surface of the base plate 5 so as not to overlap the optical information recording area 2 of the card 1; a thrusting up member 7, an elastic member 8 for energizing the thrusting up member 7 in an upper direction; a lever 9 arranged on the lower surface of the thrusting up member 7; and elastic members 10a and 10b, by which the hybrid card 1 is urged against one of side walls of the base plate 5 to determine the position of the hybrid card 1 in its width direction, provided on the other side surface of the base plate 5. When the hybrid card 1 is mounted in the shuttle 4, the card 1 is held between the thrusting up member 7 and the holding members 6a and 6b and the thrusting up member 7 is urged against the lower surfaces of the card holding members 6a and 6b by means of the elastic member 7. It should be noted that the shuttle 4 as a whole is arranged to be movable in X direction along shafts 11a, 11b.

When the hybrid card 1 is inserted in the shuttle 4, a pin 12, which is engaged with the lever 9, is moved in a lower direction by a pin driving means (not shown) to push down the lever 8 and the card thrusting up member 7 against the force of the elastic member 8, as shown in FIG. 4. Under this condition, the hybrid card 1 is pulled in the shuttle 4 by rotating rollers 13a and 13b by a motor (not shown). Thereafter, when the hybrid card 1 is completely contained in the shuttle 4, the pin 12 is returned to its original position, as shown in FIG. 5, and then the hybrid card 1 is held by the card holding members 6a and 6b and the card thrusting up member 7.

In the thrusting up member 7, is provided a contact 14, which is connected to an information processor 15 via an FPC (flexible printed circuit); and when the hybrid card 1 is held in the shuttle 4 in a proper manner, the terminals of IC chip 3 are made to contact with the contact 14 provided in the shuttle 4. Therefore, information can be recorded/reproduced in/from the IC chip via the contacting portion 14 without respect to the position of the shuttle 4. It should be noted that the shuttle 4 is reciprocally moved in X direction by means of a shuttle driving means (not shown) and optical information is recorded/reproduced on/from the optical information recording area 2 of the hybrid card 1 with the aid of a light beam emitted from an optical head 16. The hybrid card 1 is removed from the shuttle 4 by performing the operation stated in the above in a reversed manner.

Figure 6:
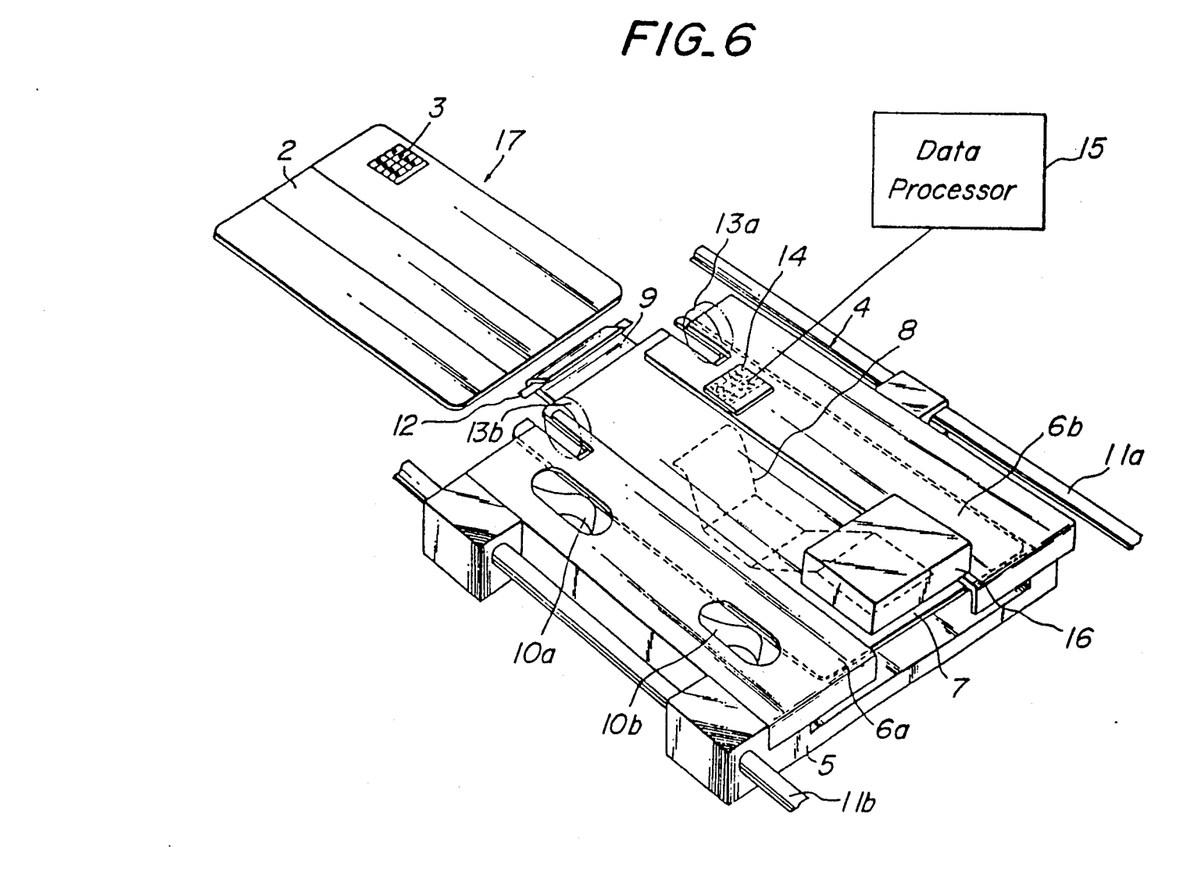
FIG. 6 is a schematic view showing a construction of the second embodiment of the apparatus according to the present invention.
Figure 7:
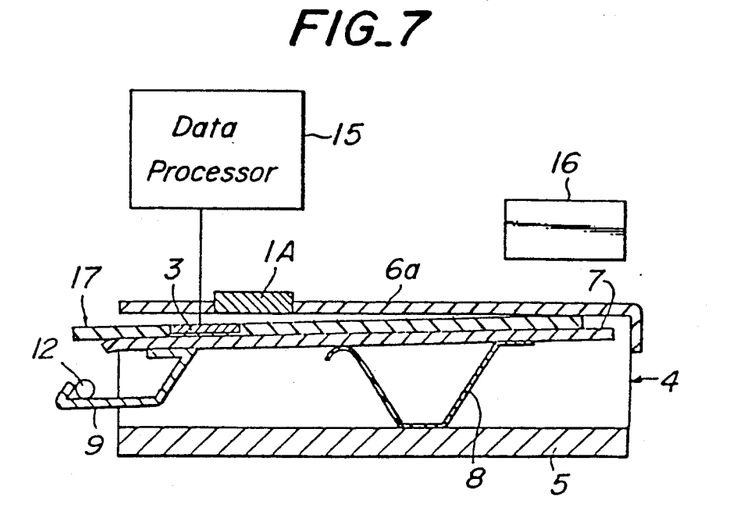
FIG. 7 is a cross-sectional view indicating a construction of the second embodiment when the hybrid card is being inserted into the shuttle of the apparatus.
Figure 8:
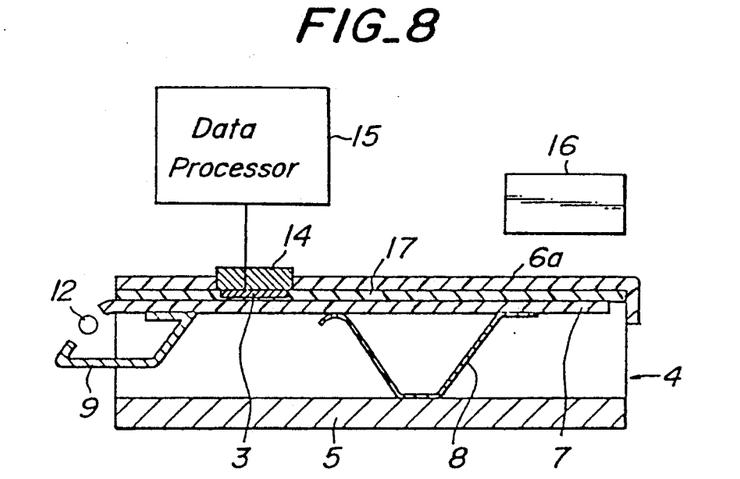
FIG. 8 is a cross-sectional view representing a construction of the second embodiment when the hybrid card has been inserted into the shuttle of the apparatus.

FIGS. 6 to 8 are schematic views showing an apparatus according to the second embodiment of the present invention. FIG. 6 is a perspective view of the shuttle 4; FIG. 7 is a cross-sectional view of the shuttle 4 when the hybrid card 17 is inserted/removed into/from the shuttle 4; and FIG. 8 is a cross-sectional view of the shuttle 4 in which the hybrid card 17 is completely held. The apparatus according to the second embodiment is for recording/reproducing information on/from the hybrid card 17 on which the optical information recording area 2 and the IC chip 3 are formed on the same surface thereof. Therefore, in the shuttle 4, is provided the contact 14 in the card holding member 6a. The contact 4 is formed in the holding member 6a such that when the hybrid card 21 is completely contained in the shuttle 4 the contact 14 is made to contact with the IC chip 3. It should be noted that the other construction of the apparatus is the same as that of the apparatus of the first embodiment.

Therefore, in the second embodiment, the IC chip 3 formed on the hybrid card 17 is made to contact with the contact 14 formed in the shuttle 4 during when the hybrid card 17 is held in the shuttle 4, so that it is possible to record/reproduce information in/from the IC chip 3 without respect to the position of the shuttle 4.

Figure 9:
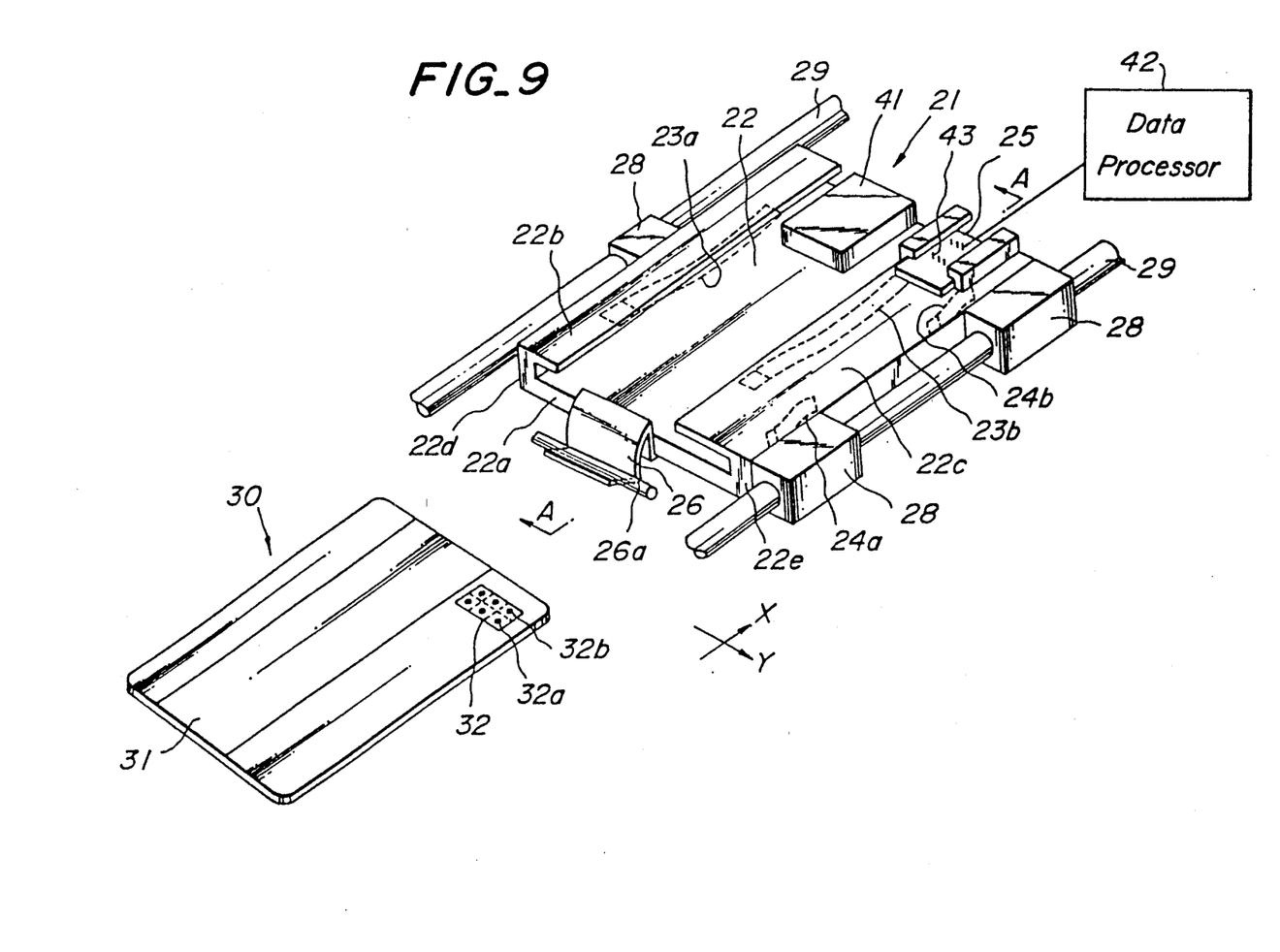
FIG. 9 is a schematic view illustrating a construction of the apparatus according to the third embodiment of the present invention.

FIG. 9 is a perspective view of the apparatus according to the third embodiment of the present invention. A shuttle 21 comprises a base plate 22 and supporting members 28, which slidably fit with guide rails 29, for making the base plate 22 slidably movable in the X direction. The guide rails 29 are provided on both sides of the base plate 22 being extended in the X direction in a parallel manner; and the supporting members 28 are arranged on both side surfaces of the base plate 22. Further, an optical head 41 is arranged above the shuttle 21 for recording/reproducing optical information on/from the optical recording area 31 of the hybrid card 30.

The base plate 22 comprises a lower plate 22a, first and second upper plates 22b and 22c, which are arranged to be separated in Y direction from each other so as not to overlap with the optical information recording area 31 of the hybrid card 30, side walls 22d and 22e. On the lower surface of the upper plates 22b and 22c, are provided elastic members 23a and 23b for urging the hybrid card 30 against the lower plate 22a; and inside of the side wall 22e, are arranged a couple of springs 24a and 24b, by which the hybrid card 30 is urged against the other side wall 22d to determine the position of the card 30 in the width direction (Y direction).

At the slot side of the lower plate 22a, is provided a stopper 26, by which the position of the hybrid card 30 is determined in its longitudinal direction. The stopper 26 is engaged with a pin 26a, which works to push down the stopper 26 when the card 30 is inserted into the shuttle 21.

In the back end portion of the second upper plate 22c, there is provided a contact member 25, through which information is recorded/reproduced in/from IC chip 32 formed on the hybrid card 30. In the contact member 25, are arranged a plurality of elastic pin electrodes 43, through which the IC chip 32 of the hybrid card 30 is made to contact with a data processor 42. It should be noted that the contact member 25 is arranged to be slidable in X direction along guide members 44.

Figure 10:
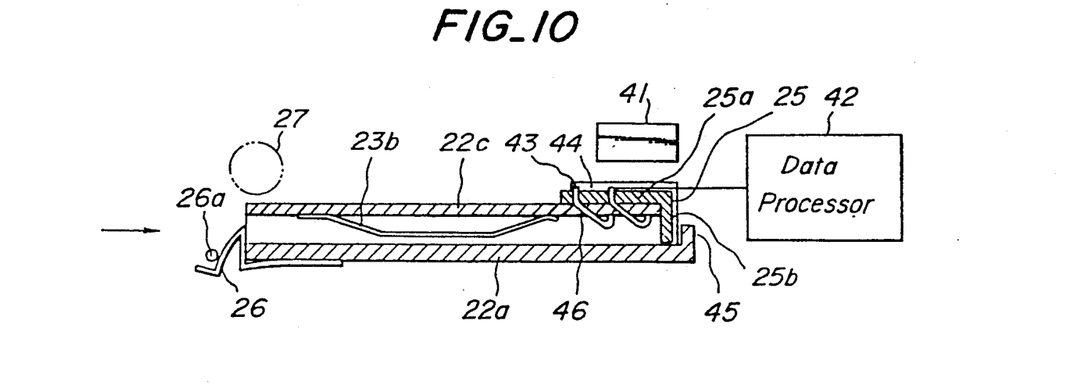
FIG. 10 is a cross sectional view indicating a construction of the third embodiment before the hybrid card is inserted in the shuttle.

FIG. 10 is a cross-sectional view of the shuttle 21 cut along A—A line in FIG. 9. The hybrid card 30 is not contained in the shuttle 21 yet. As clear from FIG. 10, the back end portion of the contact member 25 is arranged to be bent in a vertical direction; and the lower surface 25a of the flat portion of the terminal member 25 is made to contact with the upper surface of the upper plate 22c; and the bent portion 25b of the contact member 25 is to be urged by the end portion of the hybrid card 30 when the card 30 is inserted in the shuttle 21. A distance between the lower end of the bent portion 25b and the upper surface of the lower plate 22a of the shuttle is arranged to be smaller than the thickness of the hybrid card 30. Further, the back end portion of the lower plate 22a is bent toward the upper direction; and the upper bent portion 45 serves as a stopper to stop the movement of the slidable contact member 25 in X direction. It should be noted that on the stopper 45 is arranged a switch (not shown).

On the other hand, in the vicinity of the slot of the shuttle 21 are arranged rollers 27 to transfer the hybrid card 30 into the shuttle 21. The rotation of the rollers 27 is stopped when the switch arranged on the stopper 45 is turned ON.

In the back end portion of the upper plate 22c of the shuttle 21, there are formed a plurality of holes 46 to be perspective in X direction. The number of the holes corresponds to the number of pin electrodes 33. And in these holes 46 are provided pin electrodes 43 so as to pass through the perspectively arranged holes 46. It should be noted that the lower top end portions of the pin electrodes 43 are bent toward upper direction so as to make the contact surface with the terminals of the IC chip 32 large.

The operational movement of the shuttle 21 will be explained in the following.

Figure 11:
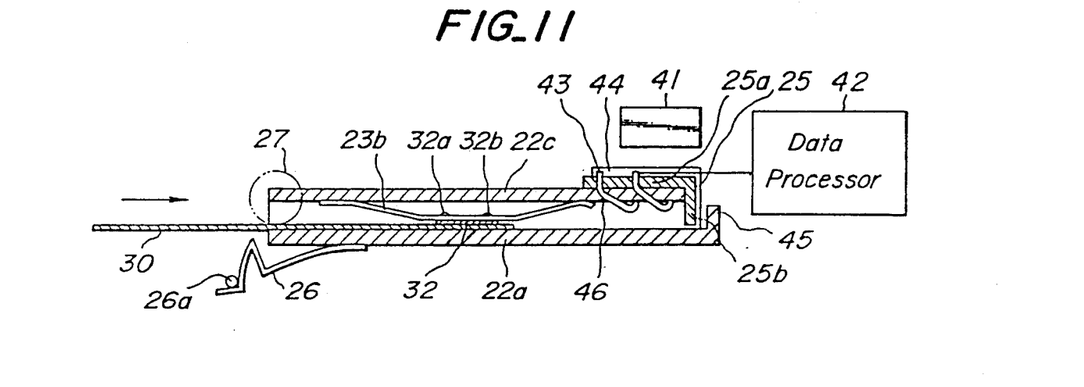
FIG. 11 is a cross sectional view representing a construction of the third embodiment in which the hybrid card is being inserted in the shuttle.

First of all, the shuttle 21 is moved near the slot, waiting the insertion of the hybrid card 30. Then, the hybrid card 30 is inserted into the shuttle 21; the terminal of the IC chip 32 is arranged on the upper surface of the card 30. A card sensor (not shown), which is provided in the vicinity of the slot, recognizes the insertion of the hybrid card 30. In accordance with a signal supplied from the card sensor, the pin 26a is moved down to push down the stopper 26 until the stopper 26 goes down under the level of the lower plate 22a of the shuttle 21. Then, the rollers 27 are moved down to hold the hybrid card 30 with the lower plate 22a. The hybrid card 30 is transferred in X direction with the aid of the rotation of the rollers 27, as shown in FIG. 11.

Figure 12:
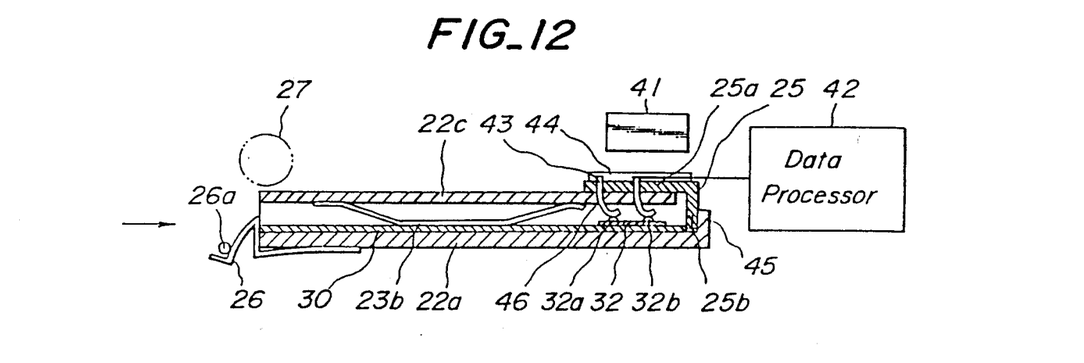
FIG. 12 is a cross sectional view showing a construction of the third embodiment in which the hybrid card has been inserted in the shuttle.

Then, the end portion of the hybrid card 30 is urged against the bent portion 25b of the contact member 25 and the contact member 25 is moved to the backward direction along the guide members 44. But, since the upper plate 22c is stopped, the pin electrodes 43 are rotated clockwisely about the contacting portion with the holes 46, respectively. Then, the lower end portions of the pin electrodes 43 are made contact with the terminals 32a of the IC chip 32 and push them down. On the other hand, the bent portion 25b of the contact member 25 is slid in the backward direction and then urged against the upper bent portion 45 of the lower plate 22a of the shuttle 21 to be stopped thereby. When the bent portion 25b is urged against the upper bent portion 45, the switch provided in the upper bent portion 45 is made ON. An then, the pin 26a is moved to the upper direction so as to release the stopper 26. The stopper 26 is moved to the upper direction to determine the position of the hybrid card 30 in its longitudinal direction. By the stopper 26, it the hybrid card 30 is prevented from returning to the slot side due to the elasticity of the pin electrodes 43. Then, the rotation of the rollers 27 is stopped and the rollers 27 are moved to the upper direction to be separated from the card 30.

In such manner, the hybrid card 30 is mounted in the shuttle 21; and optical information can be recorded/reproduced on/from the optical information recording area 31 thereon with the aid of the reciprocal movement of the shuttle in X direction with respect to the optical head 41; additionally, since the pin electrodes 43 are connected to the terminals of the IC chip 32, recording-/reproduction of information in/from the IC chip 32 can be performed.

The removing operation of the hybrid card 30 is performed as in the following.

The shuttle 21 is moved near the slot. Then the pin 26a is moved down to be urged against the stopper 26 so as to push down the shutter 26 until the upper end portion of the stopper 26 becomes under the level of the lower plate 22a. The rollers 27 is moved down so as to hold the hybrid card 30 with the lower plate 22a. The hybrid card 30 is transferred toward the slot side with the aid of the reversed rotation of the rollers 27. The contact member 25 is also slid toward the slot side with the aid of the elastic of the pin electrodes 43; and then the pin electrodes 43 are rotated in a counter-clockwise direction about the contacting portion with the holes 46 to release the connection between the pin electrodes 33 and the terminals of the IC chip 32 on the hybrid card 30.

Figure 13:
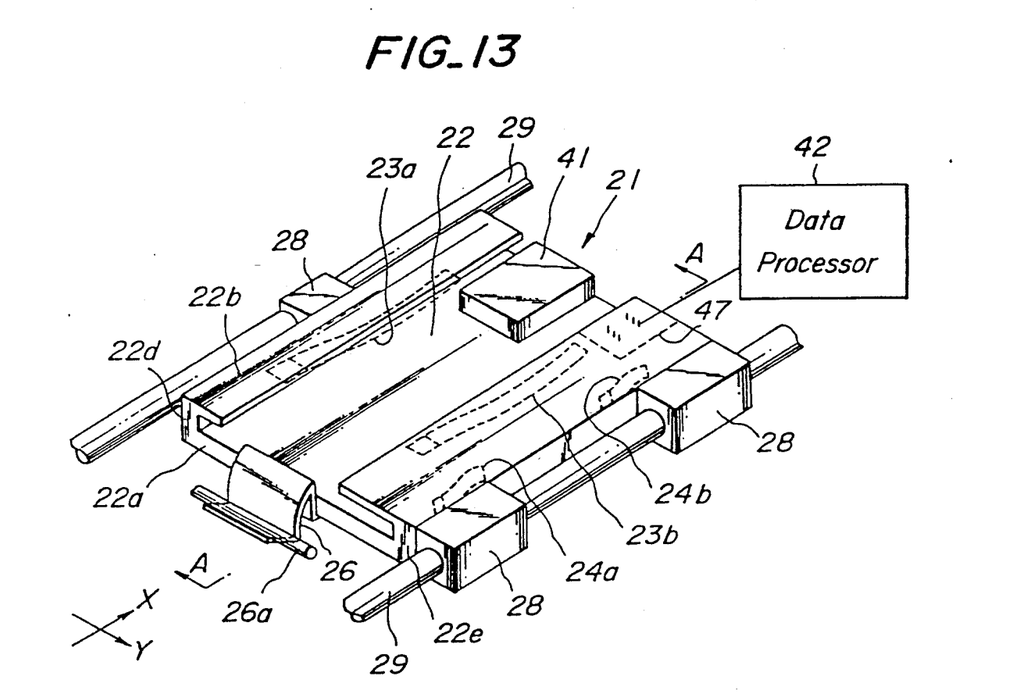
FIG. 13 is a schematic view depicting a construction of the apparatus according to the fourth embodiment of the present invention.
Figure 14:
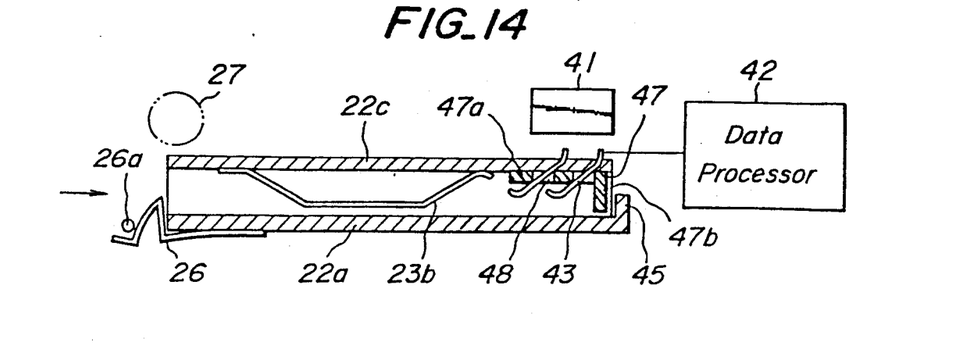
FIG. 14 is a cross sectional view indicating a construction of the fourth embodiment before the hybrid card is inserted in the shuttle.
Figure 15:
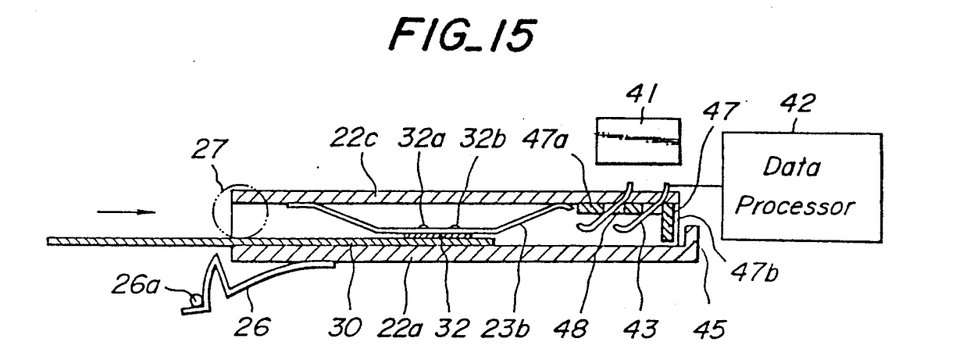
FIG. 15 is a cross sectional view representing a construction of the fourth embodiment in which the hybrid card is being inserted in the shuttle.
Figure 16:
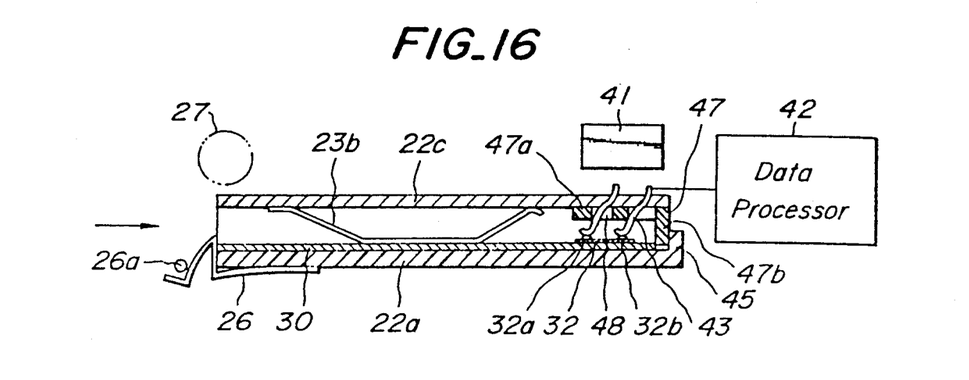
FIG. 16 is a cross sectional view showing a construction of the fourth embodiment in which the hybrid card has been inserted in the shuttle.

FIG. 13 is a perspective view showing the construction of the apparatus according to the fourth embodiment of the present invention. In FIGS. 13 to 16, the same numerical references are applied to the same elements as in the third embodiment shown in FIGS. 9 to 12 and the explanation therefor is omitted. In the fourth embodiment, a contact member 47 is provided on the lower surface of the upper plate 22c of the shuttle 21, as shown in FIGS. 14 to 16. Therefore, the upper surface of the contact member 47 is arranged to be slid with the lower surface of the upper plate 22c. The contact member 47 also comprises a bent portion 47b which is bent downwardly in a vertical direction. In the flat portion 47a of the contact member and in the upper plate 22c of the shuttle 21 are formed a plurality of holes 48 through which the pin electrodes 43 are passed, keeping their position to be at an angle. The upper ends of the respective pin electrodes 43 are fixed to the upper plate 22c of the shuttle 21. As same as the third embodiment, the lower ends of the pin electrodes 43 are bent upwardly in order to make the contacting surface with the terminals of the IC chip 32 large.

Since the operational function of the shuttle 21 is almost the same as that of the third embodiment, the explanation therefore is omitted. It should be noted that when the hybrid card 30 is inserted in the shuttle 21, the pin electrodes 47 are rotated in a counter-clockwise direction to be made in contact with the terminals of the IC chip 32; and when the hybrid card 30 is removed from the shuttle 21, the pin electrodes 47 are rotated back in a clockwise direction to release the contact.

Figure 17:
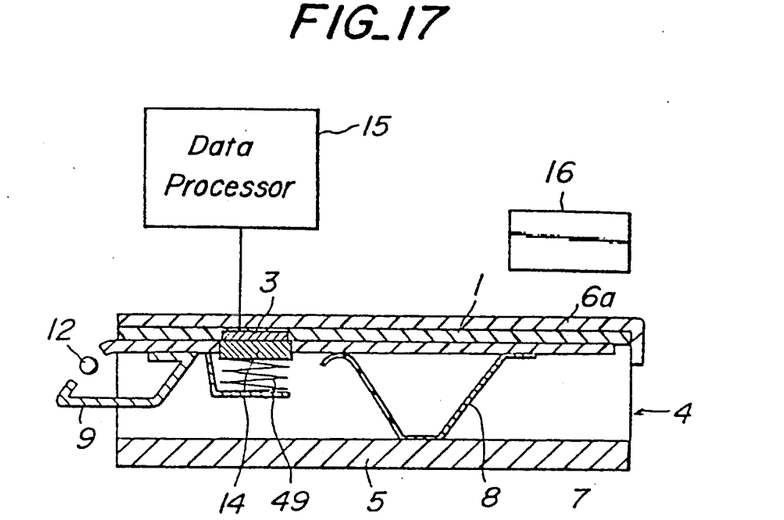
FIG. 17 is a cross-sectional view showing a construction of the modification of the first embodiment shown in FIG. 3.
Figure 18:
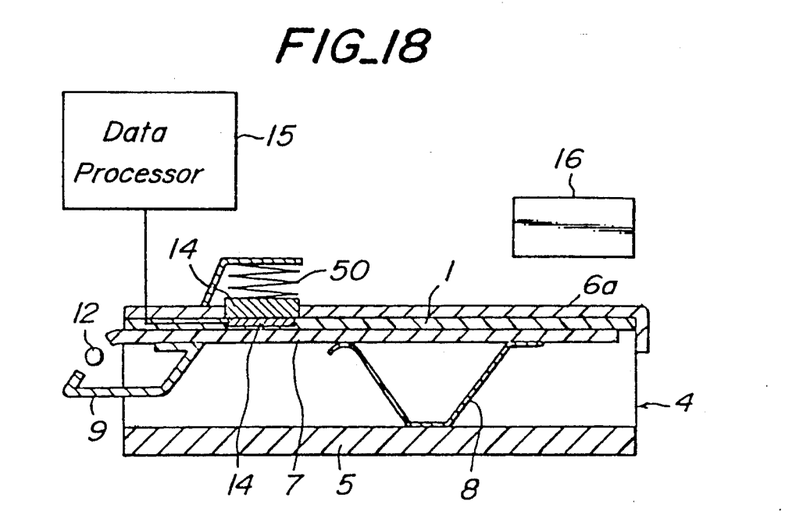
FIG. 18 is a cross sectional view depicting a construction of the modification of the second embodiment shown in FIG. 6.

The present invention is not limited to the above mentioned embodiments, but many modification or alterations may be applied therefor. For instance, in the first embodiment, the contacting portion 14 may be arranged on the card thrusting member 9 via an elastic member 49 as shown in FIG. 17. In this case, the contacting pressure of the contact portion 14 against the IC chip 3 can be adjusted. As same as the above, in the second embodiment, the contact portion 14 may be arranged on the card holding member 6a via an elastic member 50, so the contacting pressure of the contacting portion 11 against the IC chip 3 can be adjusted.

Further, in the first and second embodiments, the contact portion 14 is provided on the holding member 6 or 9 for holding the hybrid card therebetween and the contact portion 14 is connected with or separated from the IC chip 3 by the card holding operation or the card releasing operation of the holding members 6 and 9. However, it may be possible to arrange to provide that the contact portion is provided at the opposite end portion of the card 1, as in the third and fourth embodiments. In this case, the contact portion is connected to or separated from the IC chip 3 with the aid of the insertion/removing operations of the card in/from the shuttle.

Furthermore, the present invention can be applied not only to the hybrid card having an IC chip and an optical information recording area but also a hybrid card having an IC chip and a magnetic information recording area.

Moreover, in the third and fourth embodiments, the contact member 25, 47 and the pin electrodes 43 are arranged at the back end portion of the upper plate 22c of the shuttle, but the position of these elements may be changed, for example, on the upper plate 22b or on the lower plate 22c, in accordance with the position of the IC chip formed on the hybrid card 30.

As stated in the above, according to the present invention, the contact, through which information is recorded/reproduced in/from the IC chip of the hybrid card, is provided in the shuttle for containing the hybrid card. Therefore, the independent mechanism for driving the contact is not necessary, so it is possible to make the apparatus as a whole small in size and light in weight. Further, the reliability of the apparatus can be increased and the cost for manufacturing the apparatus becomes low. Furthermore, in the present invention since the contact formed in the shuttle is made contact with the terminal of the IC chip, information can be recorded/reproduced in/from the IC chip without respect to the position of the shuttle.

What is claimed is:

1. An information recording and/or reproducing apparatus for use in a hybrid type card-like information recording medium on which an IC chip and optical information recording area and/or magnetic information recording area are provided, comprising:
   a shuttle for containing said hybrid type card-like information recording medium and transferring it in an extended direction of tracks formed on the medium in a reciprocal manner;
   an optical head for recording and/or reproducing information on and/or from said optical information recording area formed on the medium, and/or a magnetic head for recording and/or reproducing information on and/or from said magnetic information recording area formed on the medium;
   an information processing means for recording and/or reproducing information in and/or from said IC chip formed on the medium; and
   a contact means for making contact between said IC chip and said information processing means when said medium is inserted in the shuttle;
   said contact means being formed in said shuttle.

2. An information recording and/or reproducing apparatus according to claim 1, wherein:
   said contact means is provided via an elastic member on the shuttle.

3. An information recording and/or reproducing apparatus according to claim 2, wherein:
   said shuttle comprises a couple of card holding means; and said contact means is formed in anyone of the card holding members.

4. An information recording and/or reproducing apparatus according to claim 1, wherein:
   said shuttle comprises a couple of card holding means; and said contact means is formed in anyone of the card holding means.

5. An information recording and/or reproducing apparatus according to claim 4, wherein:
   each of said couple of card holding means comprises upper card holding members and a lower card holding member.

6. An information recording and/or reproducing apparatus according to claim 5, wherein:
   said contact means comprises a slidable member slidably arranged on one of the upper holding members and a bent member attached to said slidable member to form an angle with said slidable member; a plurality of pin electrodes are formed in said slidable member so as to be passed through holes formed in said one of the upper holding members; said pin electrodes are arranged to be rotatable about a contacting surface of the pin electrodes with respect to the holes; and said lower holding member of the shuttle comprises a stopper for stopping the movement of the slidable member;
   whereby when the hybrid type card-like information recording medium is inserted in the shuttle, said pin electrodes are rotated so as to make contact with the IC chip formed on the information recording medium in accordance with the movement of the contact means.

7. An information recording and/or reproducing apparatus according to claim 6, wherein:
   one end portion of each of said pin electrodes is fixed to said slidable member of the contact means and the other end portion of each of said pin electrodes is curved so as to make a contacting surface with the IC chip formed on the information recording medium large.

8. An information recording and/or reproducing apparatus according to claim 5, wherein:

said contact means comprises a slidable member slidably arranged on a lower surface of one of the upper holding members and a bent member attached to said slidable member to form an angle with said slidable member; a plurality of pin electrodes are formed in said one of the upper holding members so as to be passed through holes formed in said slidable member; said pin electrodes are arranged to be rotatable about a contacting portion of the pin electrodes with respect to the holes; and said lower holding member of the shuttle comprises a stopper for stopping the movement of the slidable member;

whereby when the hybrid type card-like information recording medium is inserted in the shuttle, said pin electrodes are rotated so as to make contact with the IC chip in accordance with the movement of the contact means.

9. An information recording and/or reproducing apparatus according to claim 8, wherein:

one end portion of each of said pin electrodes is fixed to said one of the upper holding members and the other end portion of each of said pin electrodes is curved so as to make a contacting surface with the IC chip large.

10. An information recording and/or reproducing apparatus according to claim 5, wherein:

said contact means comprises a slidable member slidably arranged on one of the upper holding members and a bent member attached to said slidable member to form an angle with said slidable member; a plurality of pin electrodes are formed in said one of the upper holding members so as to be passed through holes formed in said slidable member; said pin electrodes are arranged to be rotatable about a contacting surface of the pin electrodes with respect to the holes; and said lower holding member of the shuttle comprises a stopper for stopping the movement of the slidable member;

whereby when the hybrid type card-like information recording medium is inserted in the shuttle, said pin electrodes are rotated so as to make contact with the IC chip formed on the information recording medium in accordance with the movement of the contact means.

11. An information recording and/or reproducing apparatus according to claim 10, wherein:

one end portion of said pin electrodes is fixed to said one of said upper holding members and the other end portion of each of said pin electrodes is curved so as to make a contacting surface with the IC chip formed in the information recording medium large.

12. An information recording and/or reproducing apparatus according to claim 5, wherein:

said contact means is formed in said lower card holding member.

13. An information recording and/or reproducing apparatus according to claim 4, wherein:

each of said couple of card holding means comprises upper card holding members and a lower card holding member; and said terminal means is formed in one of said upper card holding members.

14. An information recording and/or reproducing apparatus according to claim 4, wherein:

said shuttle has a slot-side end at which the medium is inserted into said shuttle; said contact means is formed at a portion of one of the holding means adjacent to said slot-side end of said shuttle; and the contact between the IC chip and the contact means is released by a movement of said one of the holding means in a vertical direction.

15. An information recording and/or reproducing apparatus according to claim 4, wherein:

said contact means is formed at a back side side portion of one of the holding means; and the contact between the IC chip and the contact means is released by a movement of the information recording medium in a horizontal direction.

* * * * *